(12) United States Patent
Li

(10) Patent No.: US 11,862,052 B2
(45) Date of Patent: Jan. 2, 2024

(54) WATER DANCE DEVICE WITH DISPLAY SCREEN EFFECT

(71) Applicant: Ken-Ming Li, Zhubei (TW)

(72) Inventor: Ken-Ming Li, Zhubei (TW)

( * ) Notice: Subject to any disclaimer, the term of this patent is extended or adjusted under 35 U.S.C. 154(b) by 481 days.

(21) Appl. No.: 17/221,350

(22) Filed: Apr. 2, 2021

(65) Prior Publication Data

US 2022/0319360 A1 Oct. 6, 2022

(51) Int. Cl.
*G09F 9/37* (2006.01)
*H04N 9/31* (2006.01)
*G02B 30/56* (2020.01)
*G09F 13/34* (2006.01)

(52) U.S. Cl.
CPC ............... *G09F 9/37* (2013.01); *G02B 30/56* (2020.01); *G09F 13/34* (2013.01); *H04N 9/3161* (2013.01)

(58) Field of Classification Search
CPC ........... G09F 9/37; G09F 13/34; G02B 30/56; H04N 9/3161; F21S 10/002; B05B 3/008
See application file for complete search history.

(56) References Cited

U.S. PATENT DOCUMENTS

| | | | | |
|---|---|---|---|---|
| 1,747,377 A * | 2/1930 | Maxon | ..................... | G09F 19/00 239/18 |
| 1,982,315 A * | 11/1934 | Lundberg | .............. | F21V 33/006 290/54 |
| 2,594,877 A * | 4/1952 | Crockett | ................ | G04B 19/30 239/18 |
| 3,162,367 A * | 12/1964 | Nowack | .................. | B05B 17/08 362/373 |
| 3,334,816 A * | 8/1967 | Mizuno | .................... | B05B 17/08 239/18 |
| 3,635,402 A * | 1/1972 | Kawamura | ............ | G04B 25/00 239/18 |
| 3,640,463 A * | 2/1972 | Kawamura | ............ | B05B 17/08 239/69 |
| 3,907,204 A * | 9/1975 | Przystawik | ............. | B05B 17/08 239/242 |
| 4,094,464 A * | 6/1978 | Kawamura | ............ | G04B 19/00 40/449 |
| 4,111,363 A * | 9/1978 | Kawamura | ............ | G04B 19/00 40/406 |

(Continued)

FOREIGN PATENT DOCUMENTS

WO WO-2020117841 A1 * 6/2020 ............ F21S 10/002

*Primary Examiner* — David R Dunn
*Assistant Examiner* — Christopher E Veraa

(57) ABSTRACT

A water dance device with display screen effect primarily comprises a box body therein are disposed a rotating water spray unit, a swinging water spray unit, a multicolored water spray unit, an intermittent water spray unit, a fogging device, and a laser projector. The rotating water spray unit and the swinging water spray unit are disposed to provide rotating and swinging water jets; the multicolored water spray unit is disposed to provide water jets of various colors; the intermittent water spray unit is disposed to provide single projectile water jets; and the fogging device is disposed to provide a foggy veil for the laser projector to project texts or images thereon. Providing various forms of water dance performance composed in its box body and advertising effect, the present invention may be placed in businesses, stores and shops for achieving the purpose of attracting potential customers.

2 Claims, 7 Drawing Sheets

(56) References Cited

U.S. PATENT DOCUMENTS

| | | | | |
|---|---|---|---|---|
| 4,240,218 | A * | 12/1980 | Kotzin | G09F 19/02 40/430 |
| 4,715,136 | A * | 12/1987 | Fuller | G09F 19/00 40/406 |
| 4,892,250 | A * | 1/1990 | Fuller | B05B 17/08 40/406 |
| 5,005,762 | A * | 4/1991 | Cacoub | B05B 17/08 239/23 |
| 5,067,653 | A * | 11/1991 | Araki | G03B 21/608 239/18 |
| 5,276,609 | A * | 1/1994 | Durlach | A63F 3/00643 40/426 |
| 5,340,024 | A * | 8/1994 | Fuller | B05B 17/08 40/406 |
| 5,368,228 | A * | 11/1994 | Adamson | B05B 1/267 239/524 |
| 5,445,322 | A * | 8/1995 | Formhals | G03B 21/608 239/18 |
| 5,678,617 | A * | 10/1997 | Kuykendal | B67D 1/06 239/18 |
| 5,737,860 | A * | 4/1998 | Whigham | G09F 13/24 40/406 |
| 5,934,563 | A * | 8/1999 | Gapco | B05B 3/06 239/258 |
| 6,176,027 | B1 * | 1/2001 | Blount | B05B 17/085 40/406 |
| 6,311,898 | B1 * | 11/2001 | Gruff | F21S 8/00 40/406 |
| 6,644,561 | B1 * | 11/2003 | Daane | B05B 15/00 239/18 |
| 10,598,323 | B1 * | 3/2020 | Schaak | G09F 19/02 |
| 11,302,223 | B1 * | 4/2022 | Cibulski | G09F 13/24 |
| 2002/0067382 | A1 * | 6/2002 | Vega et al. | G09F 19/00 347/1 |
| 2002/0179728 | A1 * | 12/2002 | Beidokhti | B05B 17/08 239/20 |
| 2008/0223951 | A1 * | 9/2008 | Tracey | B05B 1/3026 239/289 |
| 2010/0139134 | A1 * | 6/2010 | Tom | G09F 19/00 40/407 |
| 2011/0252677 | A1 * | 10/2011 | Beebe | G09F 13/24 40/406 |
| 2012/0019784 | A1 * | 1/2012 | Fuller | G03B 21/10 353/121 |
| 2012/0212712 | A1 * | 8/2012 | Scanlon | G09F 21/10 353/121 |
| 2012/0223153 | A1 * | 9/2012 | Helmsderfer | B05B 1/1654 239/69 |
| 2013/0308064 | A1 * | 11/2013 | LaDuke | H04N 9/3194 348/744 |
| 2017/0161943 | A1 * | 6/2017 | Lam | H04N 13/39 |
| 2017/0240296 | A1 * | 8/2017 | Molnar | B05B 17/08 |
| 2018/0128439 | A1 * | 5/2018 | Bruls | B05B 17/08 |
| 2022/0319360 | A1 * | 10/2022 | Li | G03B 21/608 |
| 2022/0379326 | A1 * | 12/2022 | Kimura | B05B 7/2486 |

* cited by examiner

WATER DANCE DEVICE WITH DISPLAY SCREEN EFFECT

BACKGROUND OF THE INVENTION

1. Field of the Invention

The present invention relates to a water dance device with display screen effect, and particularly to a water dance device with display screen effect which may be used to compose various forms of water dance performance and to display advertisements.

2. Description of Related Art

It is a common practice for owners of businesses, stores and shops to furnish their entrances or eye-catching spots with dolls, stuffed animals or devices such as liquid crystal displays for showing advertising images or texts to attract potential customers.

A foregoing conventional advertising strategy using dolls, stuffed animals or liquid crystal displays has the disadvantage of being monotonous. Even if consumers may stop to watch, they won't be lured inside for consumption if the advertisements are not interesting enough. In view of this, after laborious research and experiments, the applicant has devised a water dance device with display screen effect which may be used to compose various forms of water dance performance and to display advertisements.

SUMMARY OF THE INVENTION

It is a primary objective of the present invention to provide a water dance device with display screen effect which may be placed in businesses, stores and shops for being used to compose various forms of water dance performance and to display advertisements.

A foregoing water dance device with display screen effect comprises a box body therein are disposed a rotating water spray unit, a swinging water spray unit, a multicolored water spray unit, an intermittent water spray unit, a fogging device, and a laser projector, wherein the rotating water spray unit and the swinging water spray unit are disposed to provide rotating and swinging water jets, the multicolored water spray unit is disposed to provide water jets of various colors, the intermittent water spray unit is disposed to provide single projectile water jets, and the fogging device is disposed to provide a foggy veil for the laser projector to project texts or images thereon. Providing various forms of water dance performance composed in its box body and advertising effect, the present invention may be placed in businesses, stores and shops for achieving the purpose of attracting potential customers.

A foregoing water dance device with display screen effect, wherein in the rotating water spray unit is disposed a base body thereon are disposed a plurality of radially arranged nozzles with eccentric water outlets, and wherein the base body is connected to a water outlet valve and a water volume adjusting member and is further connected to a tube body via the water volume adjusting member which is connected to a control circuit for controlling the water discharge volume, so that when a flow of water enters the plurality of nozzles via the tube body the nozzles are rotated to produce rotating water jets.

A foregoing water dance device with display screen effect, wherein in the swinging water spray unit are disposed a plurality of base bodies thereon are respectively disposed nozzles, wherein the plurality of base bodies are connected to a water outlet valve and a water volume adjusting member and are further connected to the tube body via the water volume adjusting member, and wherein the nozzles are connected to a motor while the water volume adjusting member and the motor are connected to the control circuit for controlling the water discharge volume and the swinging of the nozzles, so that when a flow of water enters the nozzles via the tube body the nozzles are driven by the motor to swing and produce swinging water jets.

A foregoing water dance device with display screen effect, wherein in the multicolored water spray unit is disposed a base body thereon are disposed a nozzle and a projecting lamp with color change effect, and wherein the base body is connected to a water outlet valve and a water volume adjusting member and is further connected to the tube body via the water volume adjusting member, and wherein the projecting lamp and the water volume adjusting member are connected to the control circuit for controlling the water discharge volume and the color change of the projecting lamp, so that when a flow of water enters the nozzle via the tube body the nozzle may produce multicolored water jets in coordination with the projecting lamp.

A foregoing water dance device with display screen effect, wherein in the intermittent water spray unit is disposed a base body thereon is disposed a water outlet, wherein in an interior of the base body are disposed a rectifying space and a holding area with the base body connected to the tube body via the rectifying space, and wherein in the holding area is disposed a blocking piece connected to an electromagnetic valve which is connected to the control circuit for controlling the blocking piece to block or unblock the water outlet, so that when a flow of water enters the rectifying space and the holding area via the tube body single projectile water jets may be sprayed through the water outlet.

DETAILED DESCRIPTION OF THE PREFERRED EMBODIMENTS

Figure 1:
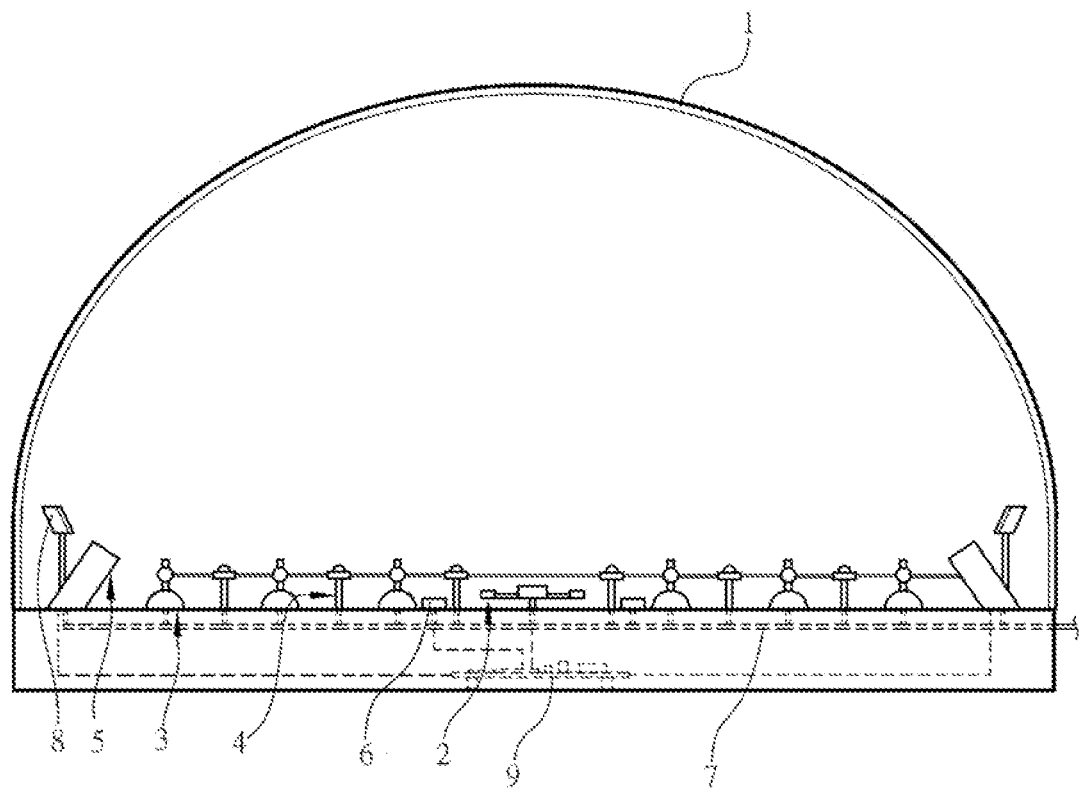
FIG. 1 is a three-dimensional view of the present invention.

Please refer to FIG. 1 showing a three-dimensional view of the present invention. As the figure shows, the present invention comprises a box body 1 therein are disposed a rotating water spray unit 2, a swinging water spray unit 3, a multicolored water spray unit 4, an intermittent water spray unit 5, a fogging device 6, and a laser projector 8. The rotating water spray unit 2, swinging water spray unit 3, multicolored water spray unit 4, intermittent water spray unit 5, and fogging device 6 are respectively connected to a tube body 7 of the box body 1 for connecting to an external water supply. And the units and the laser projector 8 are respectively connected to a control circuit 9 disposed in the box body 1.

Figure 2:
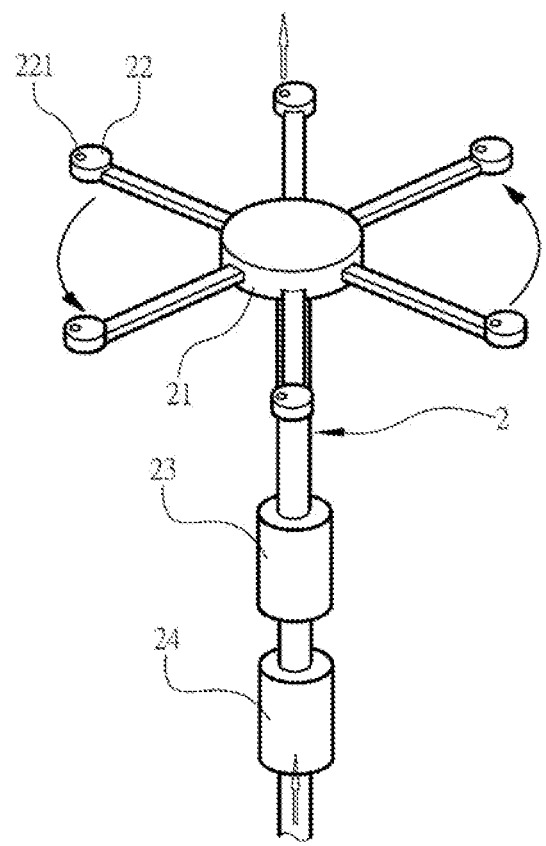
FIG. 2 is a structural drawing of a rotating water spray unit according to the present invention.

Please refer to FIG. 2, showing a structural drawing of a rotating water spray unit according to the present invention. Please also refer to FIG. 1. As the figures show, in the rotating water spray unit 2 according to the present invention is disposed a base body 21 thereon are disposed a plurality of radially arranged nozzles 22 with eccentric water outlets 221. The base body 21 is connected to a water outlet valve 23 and a water volume adjusting member 24 and is further connected to a tube body 7 via the water volume adjusting member 24 which is connected to a control circuit 9 for controlling the water discharge volume. When a flow of water enters the plurality of nozzles 22 via the tube body 7, the nozzles 22 are rotated by means of the eccentric water outlets 221 to produce rotating water jets.

Figure 3:
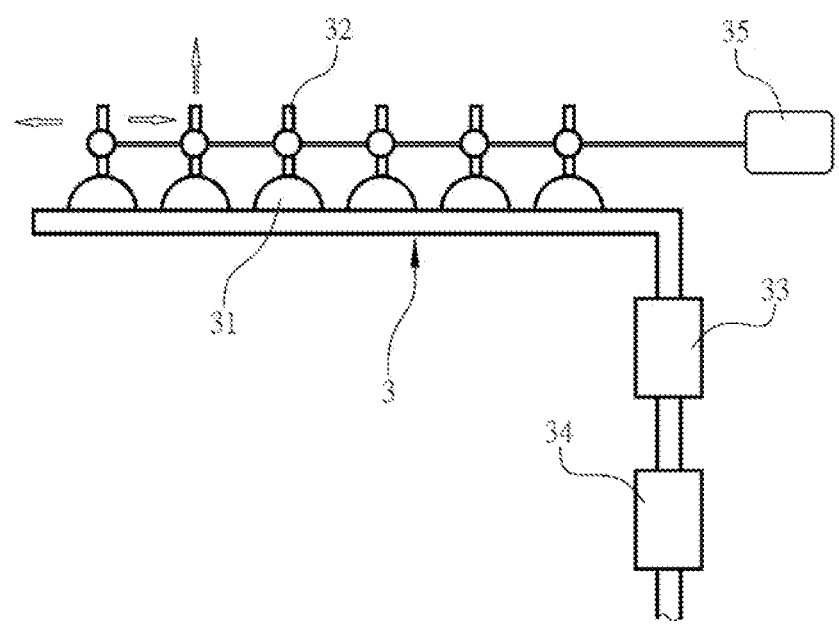
FIG. 3 is a structural drawing of a swinging water spray unit according to the present invention.

Please refer to FIG. 3, showing a structural drawing of a swinging water spray unit according to the present invention. Please also refer to FIG. 1. As the figures show, in the swinging water spray unit 3 are disposed a plurality of base bodies 31 thereon are respectively disposed nozzles 32. The plurality of base bodies 31 are connected to a water outlet valve 33 and a water volume adjusting member 34 and are further connected to the tube body 7 via the water volume adjusting member 34. The nozzles 32 are connected to a motor 35 while the water volume adjusting member 34 and the motor 35 are connected to the control circuit 9 for controlling the water discharge volume and the swinging of the nozzles 32. When a flow of water enters the nozzles 32 via the tube body 7, the nozzles 32 produce swinging water jets by means of the swinging of the nozzles 32.

Figure 4:
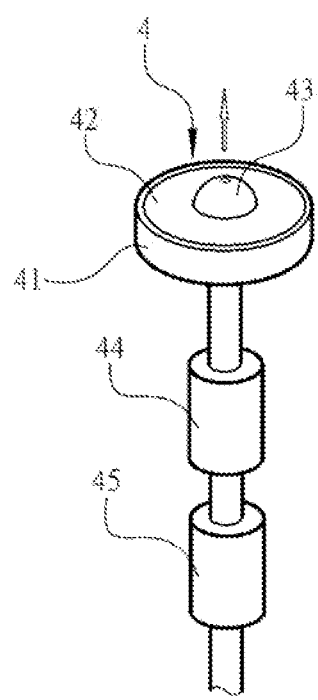
FIG. 4 is a structural drawing of a multicolored water spray unit according to the present invention.

Please refer to FIG. 4, showing a structural drawing of a multicolored water spray unit according to the present invention. Please also refer to FIG. 1. As the figures show, in the multicolored water spray unit 4 is disposed a base body 41 thereon are disposed a nozzle 43 and a projecting lamp 42 with color change effect. The base body 41 is connected to a water outlet valve 44 and a water volume adjusting member 45 and is further connected to the tube body 7 via the water volume adjusting member 45. The projecting lamp 42 and the water volume adjusting member 45 are connected to the control circuit 9 for controlling the water discharge volume and the color change of the projecting lamp 42. When a flow of water enters the nozzle 43 via the tube body 7, the nozzle 43 produces multicolored water jets by means of the projecting lamp 42.

Figure 5:
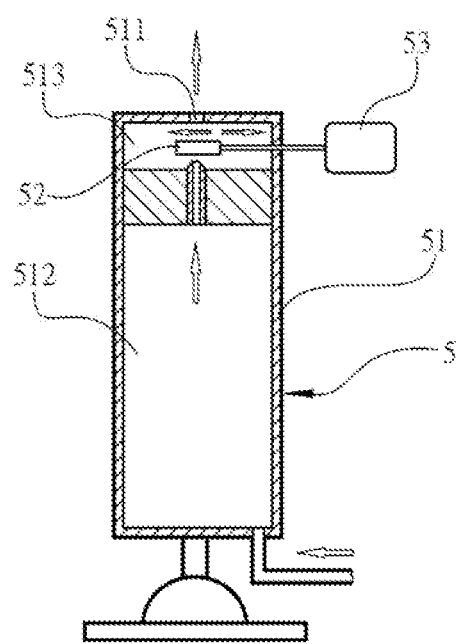
FIG. 5 is a structural drawing of an intermittent water spray unit according to the present invention.

Please refer to FIG. 5, showing a structural drawing of an intermittent water spray unit according to the present invention. Please also refer to FIG. 1. As the figures show, in the intermittent water spray unit 5 is disposed a base body 51 thereon is disposed a water outlet 511. In an interior of the base body 51 are disposed a rectifying space 512 and a holding area 513 with the base body 7 connected to the tube body 7 via the rectifying space 512. In the holding area 513 is disposed a blocking piece 52 connected to an electromagnetic valve 53 which is connected to the control circuit 9 for controlling the blocking piece 52 to block or unblock the water outlet 511. When a flow of water enters the rectifying space 512 and the holding area 513 via the tube body 7, single projectile water jets are sprayed through the water outlet 511.

Figure 6:
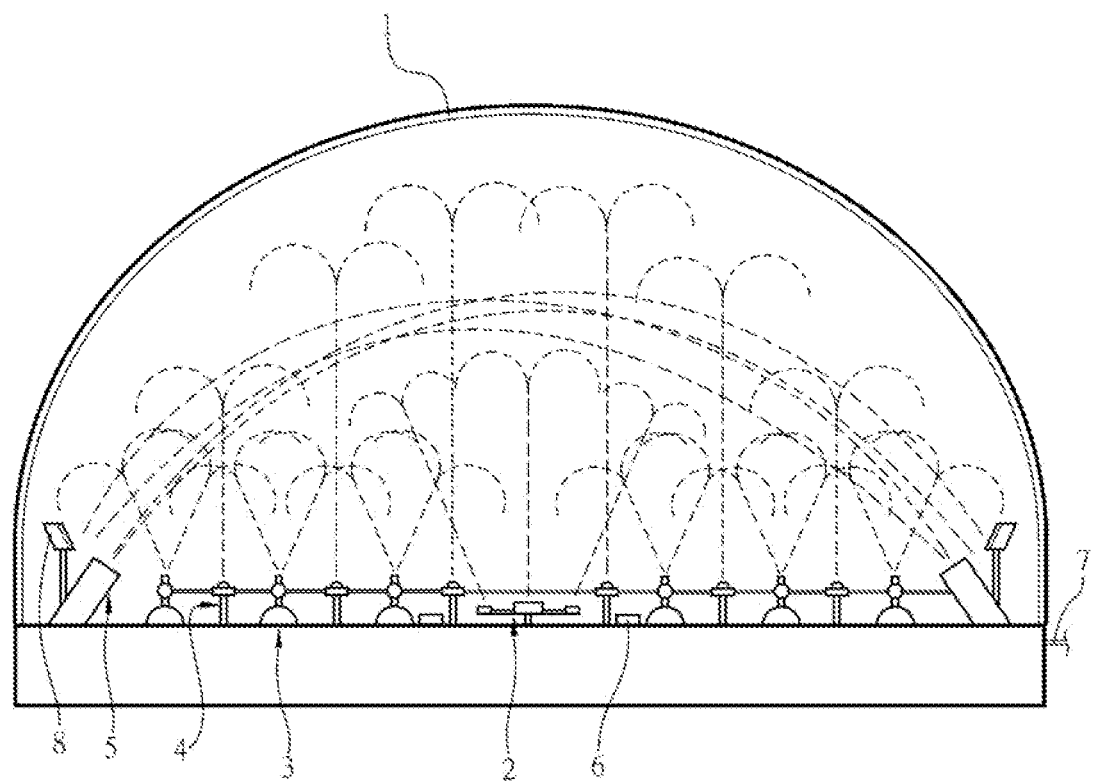
FIG. 6 is a drawing of the present invention in operation.

Please refer to FIG. 6, showing a drawing of the present invention in operation. As the figure shows, when the present invention is in operation, the rotating water spray unit 2 and the swinging water spray unit 3 provide rotating and swinging water jets, the multicolored water spray unit 4 provides water jets of various colors, and the intermittent water spray unit 5 provides single projectile water jets. Providing various forms of water dance performance composed in its box body, the present invention may be placed in businesses, stores and shops for achieving the purpose of attracting potential customers.

Figure 7:
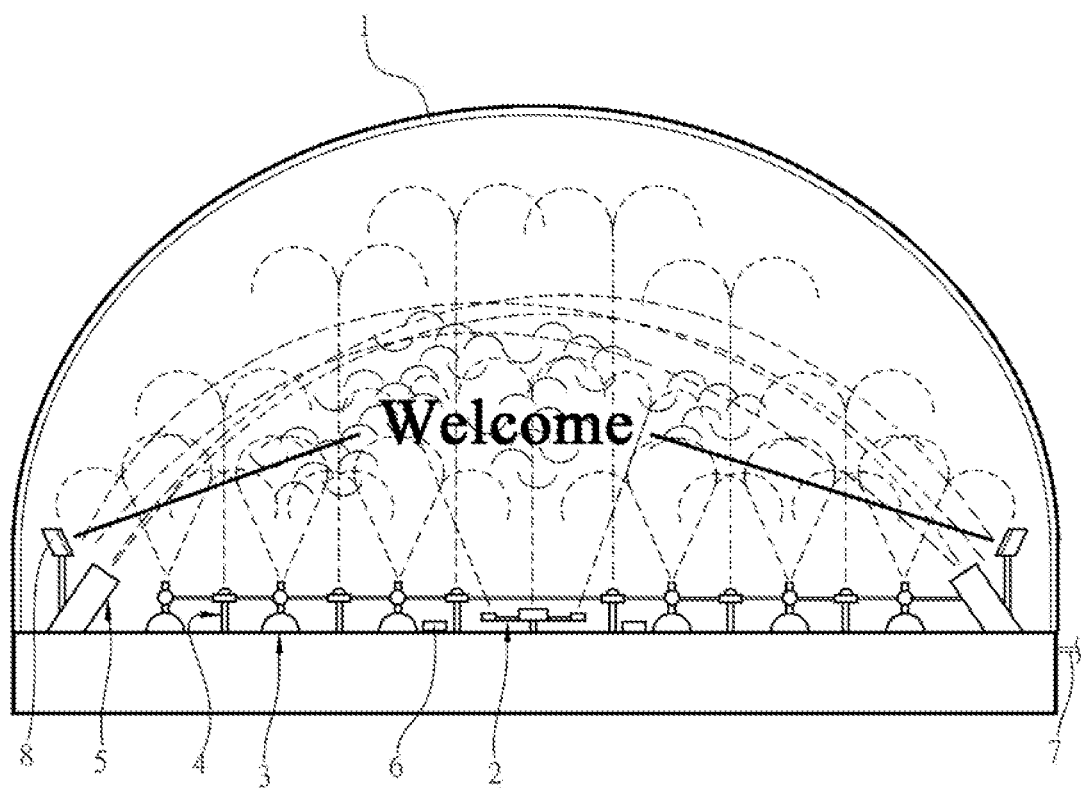
FIG. 7 is another drawing of the present invention in operation.

Please refer to FIG. 7, showing another drawing of the present invention in operation. As the figure shows, besides producing various forms of water dance performance in its box body 1, the present invention may also be used for advertising with its fogging device 6 producing a foggy veil for the laser projector 8 to project texts or images thereon under the control of the control circuit 9 according to preset programs. It may be placed in businesses, stores and shops for achieving the purpose of attracting potential customers with various forms of water dance performance and advertising effect.

The foregoing preferred embodiment of the present invention is illustrated of the present invention rather than limiting of the present invention. They are intended to cover various modifications and changes included within the spirit and scope of the appended claims, the scope of which should be accorded the broadest interpretation so as to encompass all such modifications and similar structures.

In view of the foregoing considerations, the present invention relates to a water dance device with display screen effect which comprises various water spray units operating in coordination with a fogging device and a laser projector. It may be placed in businesses, stores and shops for achieving the purpose of attracting potential customers with various forms of water dance performance and advertising effect.

What is claimed is:

1. A water dance device with display screen effect, comprising:
   a box body equipped with a control circuit and a tube body for connecting to an external water supply;
   a rotating water spray unit disposed inside the box body, wherein in the rotating water spray unit is disposed a base body thereon are disposed a plurality of radially arranged nozzles with eccentric water outlets, and wherein the base body is connected to a water outlet valve and a water volume adjusting member and is further connected to the tube body via the water volume adjusting member which is connected to a control circuit for controlling the water discharge volume, so that when a flow of water enters the plurality of nozzles via the tube body the nozzles are rotated to produce rotating water jets;
   a swinging water spray unit disposed inside the box body, wherein in the swinging water spray unit are disposed a plurality of base bodies thereon are respectively disposed nozzles, wherein the plurality of base bodies are connected to a water outlet valve and a water volume adjusting member and are further connected to the tube body via the water volume adjusting member, and wherein the nozzles are connected to a motor while the water volume adjusting member and the motor are connected to the control circuit for controlling the water discharge volume and the swinging of the nozzles, so that when a flow of water enters the nozzles via the tube body the nozzles are driven by the motor to swing and produce swinging water jets;
   a multicolored water spray unit disposed inside the box body, wherein in the multicolored water spray unit are disposed a nozzle and a projecting lamp with color change effect, wherein the base body is connected to a water outlet valve and a water volume adjusting member and is further connected to the tube body via the water volume adjusting member, and wherein the projecting lamp and the water volume adjusting member are connected to the control circuit for controlling the water discharge volume and the color change of the projecting lamp, so that when a flow of water enters the nozzle via the tube body the nozzle may produce multicolored water jets in coordination with the projecting lamp;

an intermittent water spray unit disposed inside the box body, wherein in the intermittent water spray unit is disposed a base body thereon is disposed a water outlet, wherein in an interior of the base body are disposed a rectifying space and a holding area with the base body connected to the tube body via the rectifying space, and wherein in the holding area is disposed a blocking piece connected to an electromagnetic valve which is connected to the control circuit for controlling the blocking piece to block or unblock the water outlet, so that when a flow of water enters the rectifying space and the holding area via the tube body single projectile water jets may be sprayed through the water outlet;

a fogging device disposed inside the box body and connected to the tube body and the control circuit for providing a foggy veil; and a laser projector disposed inside the box body and connected to the control circuit for projecting texts or images on the foggy veil.

2. A water dance device with display screen effect of claim 1, wherein the plurality of nozzles in the rotating water spray unit have eccentric water outlets, so that when a flow of water enters the plurality of nozzles via the tube body the nozzles are rotated by means of the eccentric water outlets to produce rotating water jets.

* * * * *